(12) United States Patent
Biamonte et al.

(10) Patent No.: US 6,995,530 B2
(45) Date of Patent: Feb. 7, 2006

(54) SYSTEM, METHOD, AND AN ARTICLE OF MANUFACTURE FOR STARTING A BRUSHLESS DIRECT CURRENT MOTOR

(75) Inventors: Jeffrey R. Biamonte, Hyde Park, NY (US); Raymond J. Harrington, Staatsburg, NY (US); Timothy Trifilo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 10/830,348

(22) Filed: Apr. 22, 2004

(65) Prior Publication Data

US 2005/0237017 A1 Oct. 27, 2005

(51) Int. Cl.
*H02P 3/18* (2006.01)
(52) U.S. Cl. .................... 318/254; 318/138; 318/439; 318/459; 318/500; 388/928.1
(58) Field of Classification Search ............... 318/138, 318/254, 439, 459, 500, 432, 434; 388/928.1
See application file for complete search history.

(56) References Cited

U.S. PATENT DOCUMENTS

| | | | |
|---|---|---|---|
| 5,017,845 A | 5/1991 | Carobolante et al. | 318/138 |
| 5,034,668 A | 7/1991 | Bausch | 318/254 |
| 5,198,733 A | 3/1993 | Wright | 318/254 |
| 5,327,053 A | 7/1994 | Mann et al. | 318/254 |
| 5,350,984 A * | 9/1994 | Carobolante et al. | 318/254 |
| 5,397,972 A | 3/1995 | Maiocchi | 318/439 |
| 5,491,393 A * | 2/1996 | Uesugi | 318/439 |
| 5,569,990 A | 10/1996 | Dunfield | 318/254 |
| 5,572,097 A * | 11/1996 | Cameron | 318/254 |
| 5,598,074 A | 1/1997 | Huang | 318/439 |
| 5,726,543 A | 3/1998 | Park et al. | 318/254 |
| 5,783,917 A | 7/1998 | Takekawa | 318/439 |
| 5,886,486 A | 3/1999 | Jeong et al. | 318/254 |
| 6,100,656 A | 8/2000 | El-Sadi et al. | 318/254 |
| 6,160,367 A * | 12/2000 | Higashi et al. | 318/254 |

FOREIGN PATENT DOCUMENTS

JP 11-09885 9/1999

OTHER PUBLICATIONS

Improved Displacement Amplification Recoery Method for Sensorless Spindle Motor Startup; Research Disclosure, Sep. 1991, No. 239, 23963.

(Continued)

*Primary Examiner*—Rina Duda
(74) *Attorney, Agent, or Firm*—Floyd A. Gonzalez; Cantor Colburn LLP (57) ABSTRACT

A system and a method for starting a brushless DC motor are provided. The method includes applying commutation pulses to at least two phase coils to induce a rotor to rotate to a starting position and then de-energizing the at least two phase coils. The method further includes applying commutation pulses to at least two phase coils to induce the rotor to rotate from the starting position in a predetermined direction. The method further includes de-energizing all phase coils for a first time interval after the rotor is rotating and sampling a back EMF signal in at least one of the phase coils to determine a first value indicative of an electrical period of the back EMF signal or a portion of an electrical period of the back EMF signal. Finally, the method includes applying commutation pulses to at least two phase coils for a second time interval, the second time interval being based on the first value.

19 Claims, 6 Drawing Sheets

OTHER PUBLICATIONS

Method to Detect the Rotor Posistion of a Sensorless Brushless DC Motor; IBM Technical Disclosure Bulletin, vol. 33, No. 10B, Mar. 1991, pp. 404-406.

Pulse Width Modulation Motor Drive Circuit; IBM Technical Disclosure Bulletin, vol. 38, No. 08, Aug. 1995, pp. 609-610.

* cited by examiner

SYSTEM, METHOD, AND AN ARTICLE OF MANUFACTURE FOR STARTING A BRUSHLESS DIRECT CURRENT MOTOR

FIELD OF INVENTION

The invention relates to a system, method, and an article of manufacture for starting a brushless direct current (DC) motor.

BACKGROUND OF INVENTION

Brushless sensorless DC motors have been used extensively to power devices such as blowers. In order to start a brushless sensorless DC motor, a calibrated sequence of commutation pulses must be applied to phase coils in the motor. These commutation pulses increase at a frequency rate that closely matches the rate at which a rotor of the motor accelerates to start and maintain a rotation of the rotor.

Brushless sensorless DC motors generally utilize back electromotive force (EMF) signals generated in the phase coils to determine the rotor position. Each of the back EMF signals has an amplitude that varies linearly with motor speed and has a zero value when a rotor is not rotating or is rotating at low speeds. Thus, motor control circuits have difficulty in detecting the rotor position when the rotor is not spinning or is spinning at low speeds. Thus, techniques for starting brushless sensorless DC motors have required that the start-up sequence of commutation pulses be "tuned" to a motor/load combination.

The tuning/calibration process is a time-consuming process that requires an engineer to characterize motor start-up parameters, such as the duration and amplitude of each of the commutation pulses, that correlate to the acceleration characteristics of the motor/load combination. However, if the motor torque, load, or applied voltage at a customer site varies substantially from those used during the tuning/calibration process, the preset start-up parameters (such as a pre-set commutation pulse duration or amplitude), may not properly start the motor at the customer site.

Thus, it would be desirable to have an adaptive method for starting a brushless sensorless DC motor that can sense a position and a speed of the motor during start-up when a rotor is not rotating or rotating at low speeds, and then adjust the duration and amplitude of commutation pulses to repeatedly start up the motor under varying operating conditions.

SUMMARY OF INVENTION

A method for starting a brushless DC motor in accordance with an exemplary embodiment is provided. The method includes applying commutation pulses to at least two phase coils to induce a rotor to rotate to a starting position and then de-energizing the at least two phase coils. The method further includes applying commutation pulses to at least two phase coils to induce the rotor to rotate from the starting position in a predetermined direction. The method further includes de-energizing all phase coils for a first time interval after the rotor is rotating and sampling a back EMF signal in at least one of the phase coils to determine a first value indicative of an electrical period of the back EMF signal or a portion of an electrical period of the back EMF signal. Finally, the method includes applying commutation pulses to at least two phase coils for a second time interval, the second time interval being based on the first value.

A system for starting a brushless DC motor having a plurality of phase coils in accordance with another exemplary embodiment is provided. The system includes a control circuit configured to be electrically coupled to the plurality of phase coils. The control circuit is configured to apply commutation pulses to at least two phase coils to induce a rotor to rotate to a starting position and then de-energizing the at least two phase coils. The control circuit is further configured to apply commutation pulses to at least two phase coils to induce the rotor to rotate from the starting position in a predetermined direction. The control circuit is further configured to de-energize all phase coils for a first time interval after the rotor is rotating and to sample a back EMF signal in at least one of the phase coils to determine a first value indicative of an electrical period of the back EMF signal or a portion of an electrical period of the back EMF signal. The control circuit is further configured to apply commutation pulses to at least two phase coils for a second time interval, the second time interval being based on the first value.

An article of manufacture in accordance with another exemplary embodiment is provided. The article of manufacture includes a computer storage medium having a computer program encoded therein for starting a brushless direct current motor. The computer storage medium includes code for applying commutation pulses to at least two phase coils to induce a rotor to rotate to a starting position and then de-energizing the at least two phase coils. The computer storage medium further includes code for applying commutation pulses to at least two phase coils to induce the rotor to rotate from the starting position in a predetermined direction. The computer storage medium further includes code for de-energizing all phase coils for a first time interval after the rotor is rotating and sampling a back EMF signal in at least one of the phase coils to determine a first value indicative of an electrical period of the back EMF signal or a portion of an electrical period of the back EMF signal. Finally, the computer storage medium includes code for applying commutation pulses to at least two phase coils for a second time interval, the second time interval being based on the first value.

A method for starting a brushless direct current motor in accordance with another exemplary embodiment is provided. The method includes applying commutation pulses to at least two phase coils to induce a rotor to rotate to a starting position and then de-energizing the at least two phase coils. The method further includes applying commutation pulses to at least two phase coils to induce the rotor to rotate from the starting position in a predetermined direction. The method further includes de-energizing all phase coils for a first time interval after the rotor is rotating and sampling back EMF signals from all phase coils and determining a back EMF amplitude value based on the back EMF signals. Finally, the method includes applying commutation pulses to at least two phase coils having an amplitude based on the back EMF amplitude value.

Other systems, methods and/or computer program products according to the embodiments will become or are apparent to one with skill in the art upon review of the following drawings and detailed description. It is intended that all such additional systems, methods, and/or computer program products be within the scope of the present invention, and be protected by the accompanying claims.

DESCRIPTION OF THE EMBODIMENTS

Figure 2:
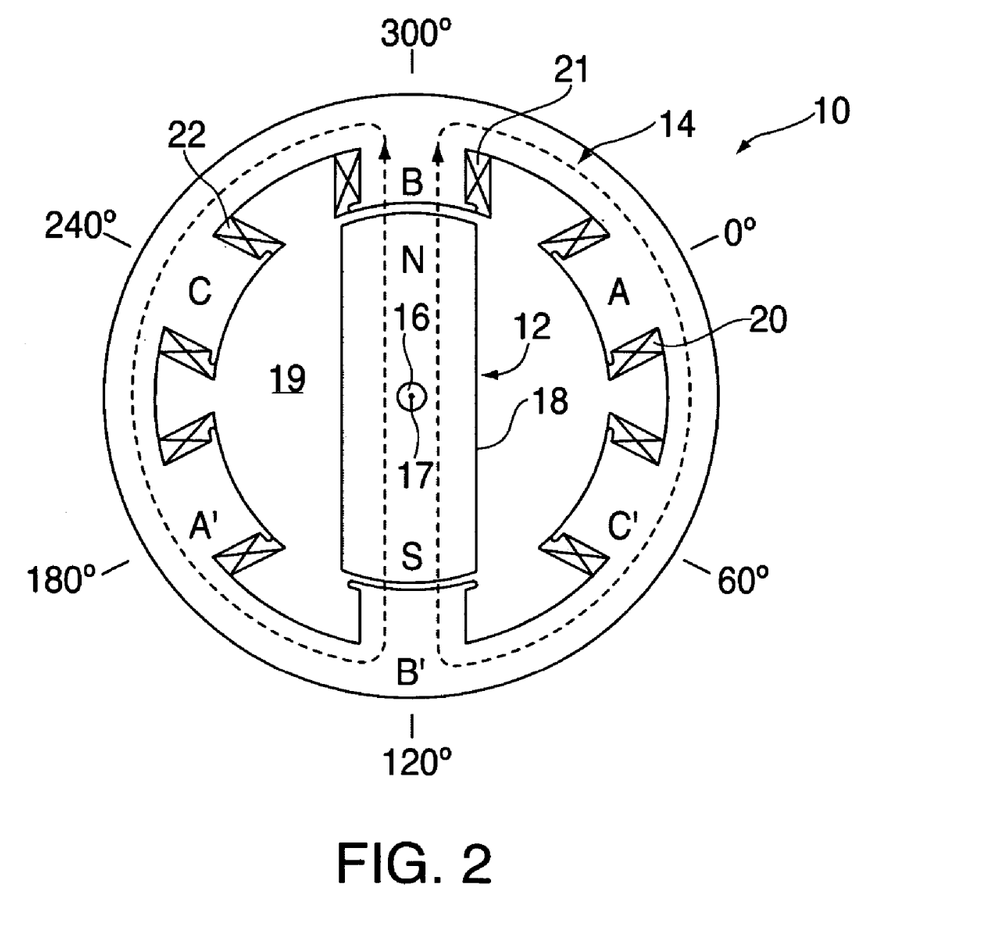
FIG. 2 is a schematic of a brushless DC motor having a stator and a rotor.

Referring to FIG. 2, a conventional sensorless brushless DC motor 10 is illustrated. Although the motor 10 comprises a brushless DC motor, it should be understood the invention disclosed herein could be applied to other motors known in the art. The motor 10 includes a rotor assembly 12 and a stator assembly 14 both of which may be centered about an axis 17. Although the illustrated embodiment includes three phase coils 20, 21, 22, it will be understood by those skilled in the art that the number of motor phase coils can vary.

The rotor assembly 12 is provided to move a load (not shown) connected to the rotor assembly 12. The rotor assembly 12 includes a shaft 16 and a rotor 18 disposed about the shaft 16. The shaft 16 is provided to engage either the load or other means for engaging the load. The shaft 16 extends longitudinally along axis 17 and may be centered about axis 17. The rotor 18 is provided to impart rotation to shaft 16 and is capable of clockwise or counterclockwise rotation. The rotor 18 is constructed from a permanent magnet and includes two poles "N" and "S". It will be understood by those skilled in the art that the number of poles of rotor 18 can vary.

The stator assembly 14 is provided to produce a torque to cause rotation of the rotor assembly 12. The stator assembly 14 comprises a plurality of laminations (not shown) from a material, such as iron, having a relatively low magnetic reluctance. The stator assembly 14 includes a plurality of radially inwardly extending poles configured as diametrically opposed stator pole pairs A–A', B–B', C–C'. Each pair of stator poles is provided to attract a rotor pole of the rotor assembly 12 and thereby cause rotation of the rotor assembly 12. The stator poles are generally rectangular in cross-section and can extend along the axial length of the stator assembly 14. Further, the stator poles define a bore 19 to receive the rotor assembly 12. It will be understood by those skilled in the art that the number of stator poles may vary.

Rotation of the rotor assembly 12 is produced by initiating, and later commutating, current pulses in phase coils 20, 21, 22 each surrounding a corresponding stator pole pair. Phase coils 20, 21, 22 are formed by connecting, in series or in parallel, windings on diametrically opposed stator poles. As one of phase coils 20, 21, 22 begins to conduct current, the nearest rotor pole is magnetically attracted towards the stator pole pair around which the energized phase coil is wound. By initiating and commutating conduction intervals in phase coils surrounding consecutive stator pole pairs, a desired torque can be produced.

Figure 1:
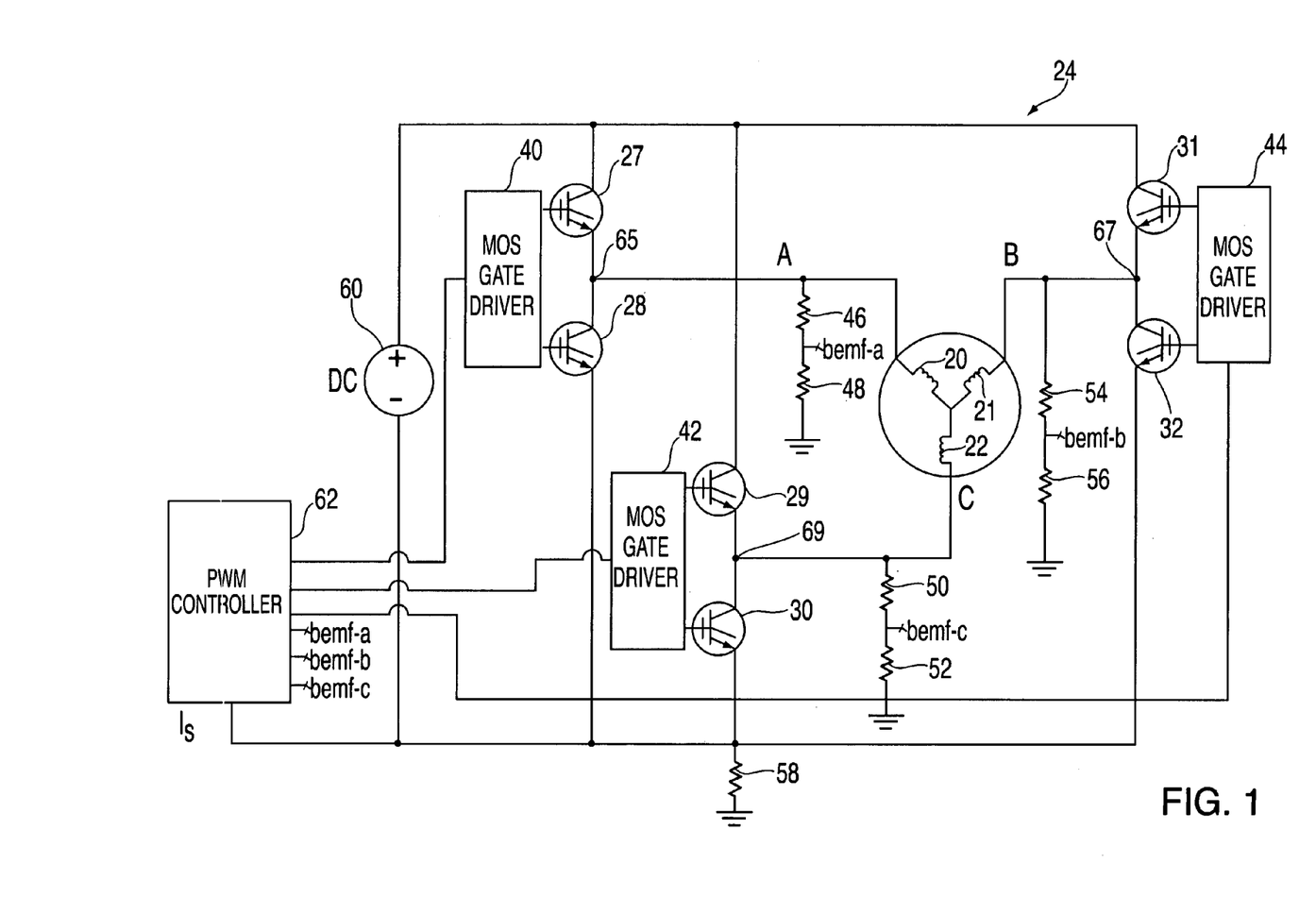
FIG. 1 is a schematic of a control circuit for starting a brushless DC motor.

Referring to FIG. 1, the control circuit 24 is provided to generate commutation pulses to start the brushless DC motor 10 and to continue operating motor 10 after start up. The control circuit 24 includes switches 27, 28, 29, 30, 31, 32, the phase coils 20, 21, 22, MOSFET gate drivers 40, 42, 44, resistors 46, 48, 50, 52, 54, 56, a current sense resistor 58, a DC voltage source 60, and a pulse-width modulation (PWM) controller 62.

The switches 27, 28, 29, 30, 31, 32 are provided to selectively couple a power supply 62 with phase coils 20, 21, 22 to energize and de-energize the coils. Switches 27, 28, 29, 30, 31, 32 are conventional in the art and may take any of a plurality of forms well-known in the art. For example, the switches may comprise MOSFETs. As shown, the switches 27, 28 are connected in series between positive and negative terminals of DC voltage source 60. A node 65 between switches 27, 28 is electrically coupled to resistor pair 46, 48 and to phase coil 20. The switches 31, 32 are connected in series between positive and negative terminals of the DC voltage source 60. A node 67 between switches 31, 32 is electrically coupled to resistor pair 54, 56 and phase coil 21. The switches 29, 30 are connected in series between positive and negative terminals of the DC voltage source 60. A node 69 between switches 29, 30 is electrically coupled to resistor pair 50, 52 and phase coil 22.

The pair of resistors 46, 48 are provided to indicate a back EMF signal (bemf-a) generated by phase coil 20 that is indicative of a position of the rotor 18 when phase coil 20 is de-energized. The pair of resistors 50, 52 are provided to indicate a back EMF signal (bemf-c) generated by phase coil 22 that is indicative of a position of the rotor 18 when phase coil 22 is de-energized. The pair of resistors 54, 56 are provided to indicate a back EMF signal (bemf-b) generated by phase coil 21 that is indicative of a position of the rotor 18 when phase coil 21 is de-energized. As shown, the PWM controller 62 receives the back EMF signals (bemf-a), (bemf-b), (bemf-c) and will utilize the signals to control the start up of the motor 10 as described in greater detail below.

MOSFET gate drivers 40, 42, 44 are provided to provide control signals to switches 27, 28, 29, 30, 31, 32 for providing commutation signals to phase coils 20, 21, 22 in response to PWM control signals received from the PWM controller 62.

The PWM controller 62 is provided to initiate and commutate the commutation pulses of each motor phase. In particular, the PWM controller 62 is operably coupled to the drivers 40, 42, 44 and sends pulse width modulation control signals to the drivers to control commutation pulses in each phase coil.

The current sense resistor 58 is utilized by the PWM controller 62 to measure the current being applied to each of the phase coils in order to ensure that a sufficient current is being applied thereto to produce rotation of the rotor 18.

Referring to FIGS. 3–6, a method for starting a sensorless brushless DC motor in accordance with an exemplary embodiment will now be explained. It should be noted that during the execution of the following method, the PWM controller 62 also executes a background algorithm to maintain a current in each of the phase coils at a relatively constant current value during each commutation step. A substantial advantage of the following method is that the method allows a PWM controller 62 to sense a position and a speed (or electrical period) of the motor during start-up, and then adjust the duration and amplitude of commutation pulses to repeatedly start up the motor under varying start-up conditions.

Figure 3:
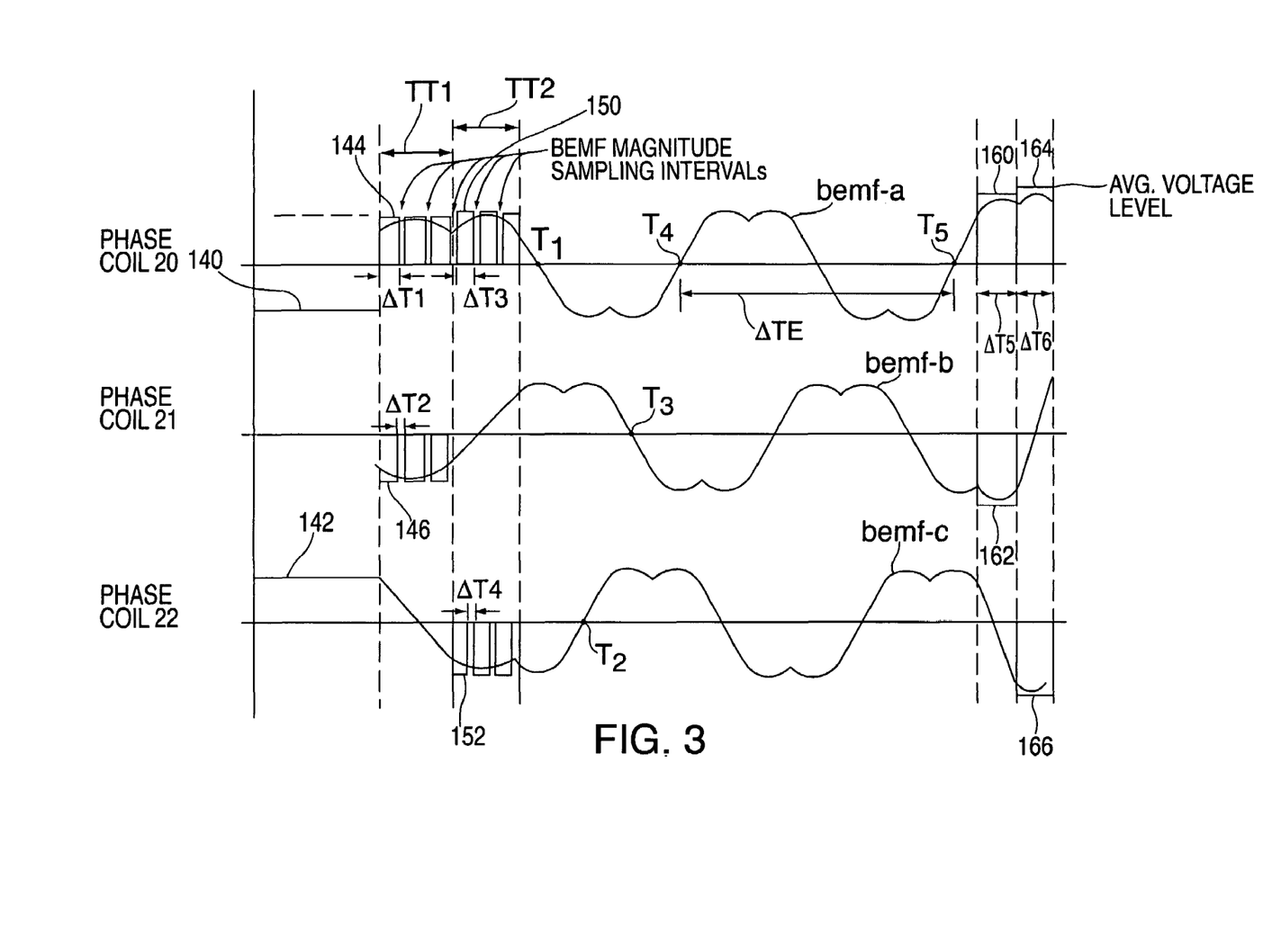
FIG. 3 is a signal schematic of the average values of commutation signals applied to a brushless DC motor during start-up of the motor.
Figure 4:
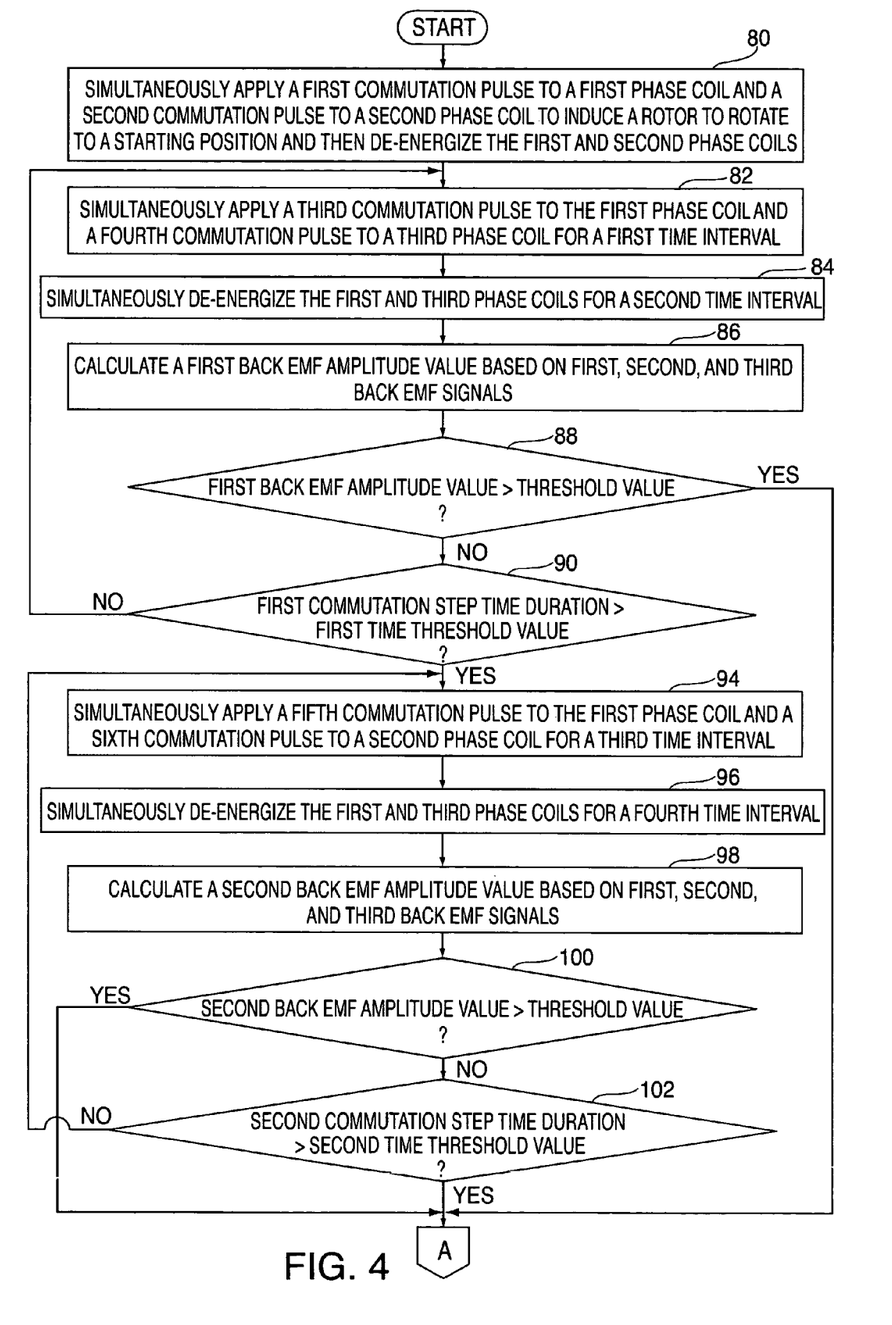
FIGS. 4–6 are flowcharts of a method for starting a sensorless brushless DC motor in accordance with an exemplary embodiment.

At step 80, the PWM controller 62 simultaneously applies a commutation pulse 140 to the phase coil 20 and a second commutation pulse 142 to the phase coil 22 to induce the rotor 18 to rotate to a starting position and then de-energizes the phase coils 20, 22.

At step 82, the PWM controller 62 simultaneously applies a third commutation pulse 144 to the phase coil 20 and a fourth commutation pulse 146 to the phase coil 21 for a time interval ΔT1.

At step 84, the PWM controller 62 simultaneously de-energizes the phase coils 20, 21 for a time interval ΔT2. It should be noted that the phase coils are de-energized, to reduce electrical noise generated by the phase coils, to allow an accurate measurement of the back EMF signals.

Figure 6:
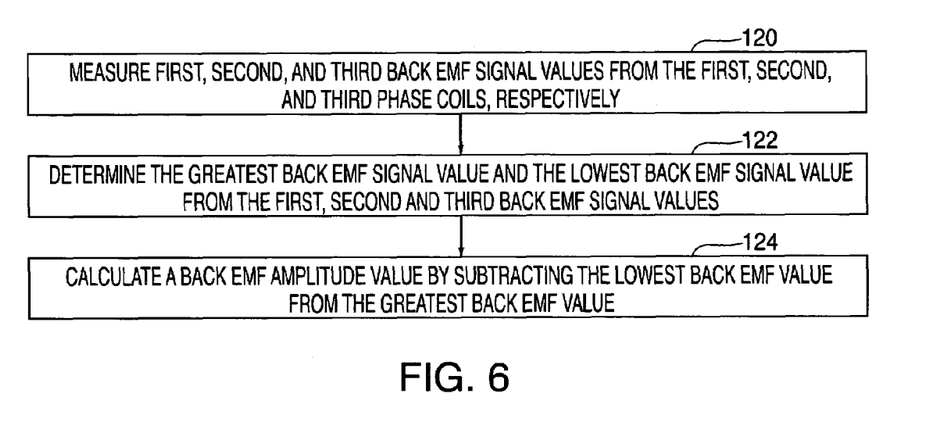

At step 86, the PWM controller 62 calculates a first back EMF amplitude value based on back EMF signals (bemf-a), (bemf-b), (bemf-c). In particular, to implement the step 86, the PWM controller 62 performs the steps 120–124. At step 120, the PWM controller 62 measures first, second, and third back EMF signal values based on the signals (bemf-a), (bemf-b), (bemf-c), respectively, from the phase coils 20, 21, 22, respectively. At step 122, the PWM controller 62 determines the greatest back EMF signal value and the lowest back EMF signal value from the first, second, and third back EMF signal values. At step 124, the PWM controller 62 calculates a back EMF amplitude value by subtracting the lowest back EMF value from the greatest back EMF value.

At step 88, the PWM controller 62 makes determination as to whether the first back EMF amplitude value is greater than a threshold value. The threshold valve is empirically determined. If the value of step 88 equals "yes", the method advances to step 104. Otherwise, the method advances to step 90.

At step 90, the PWM controller 62 makes determination as to whether the first commutation step time duration is greater than a first time threshold value (TT1). If the value of step 90 equals "yes", the method advances to step 94. Otherwise, the method returns to step 82.

At step 94, the PWM controller 62 simultaneously applies a fifth commutation pulse 150 to the phase coil 20 and a sixth commutation pulse 152 to a phase coil 22 for a time interval ΔT3.

At step 96, the PWM controller 62 simultaneously de-energizes the phase coils 20, 22 for a time interval ΔT4.

At step 98, the PWM controller 62 calculates a second back EMF amplitude value based on the back EMF signals (bemf-a), (bemf-b), and (bemf-c) utilizing the steps 120–124.

At step 100, the PWM controller 62 makes a determination as to whether the second back EMF amplitude value is greater than the threshold value. If the value of step 100 equals "yes", the method advances to step 102. Otherwise, the method advances to step 104.

At step 102, the PWM controller 62 makes a determination as to whether the second commutation step time duration is greater then the second time threshold value (TT2). If the value of step 102 equals "yes", the method advances to step 104. Otherwise, the method returns to step 94.

Figure 5:
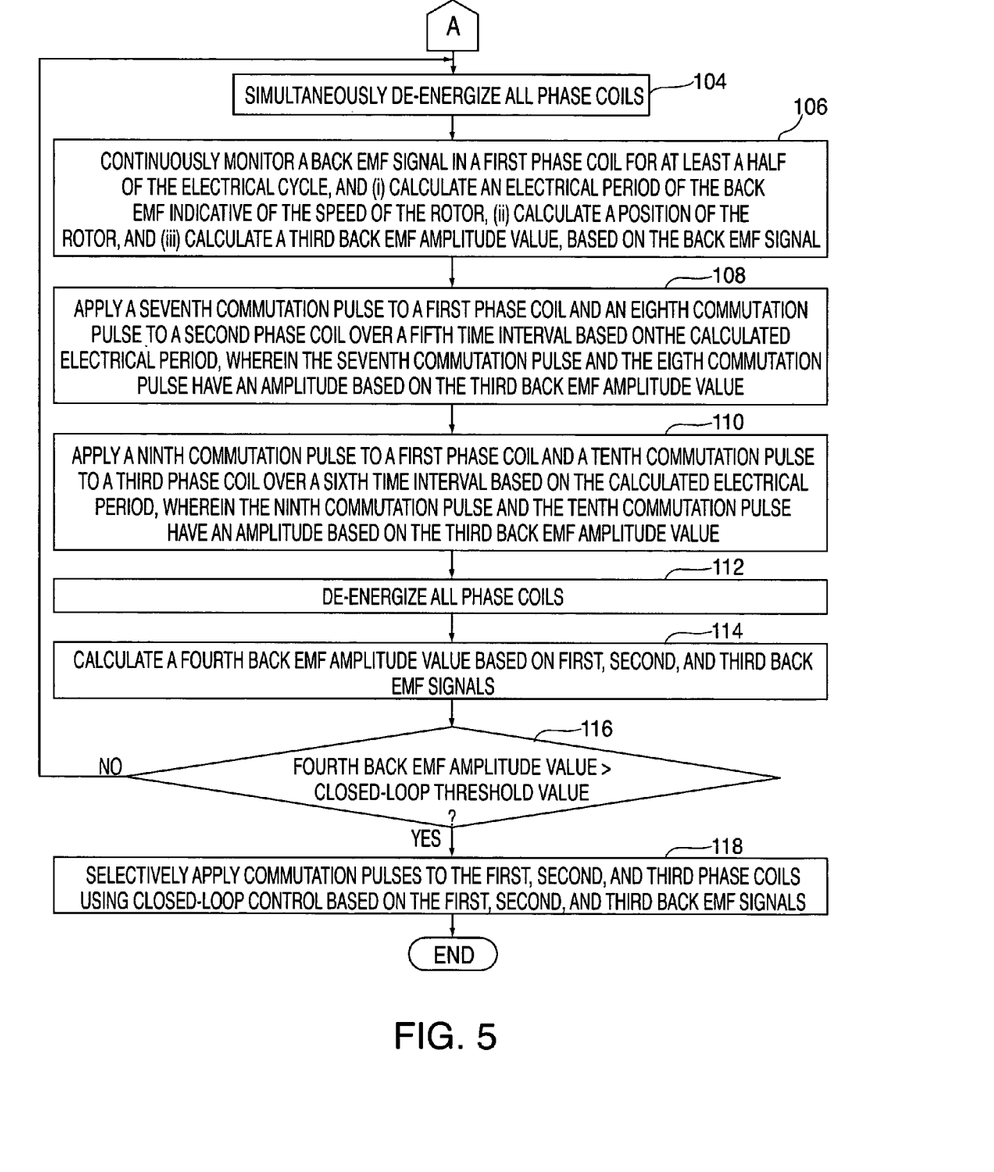

At step 104, the PWM controller 62 simultaneously de-energizes all phase coils 20, 21, 22.

At step 106, the PWM controller 62 continuously monitors a back EMF signal in phase coil 20 for least a half of the electrical cycle, and calculates an electrical period ΔTE of the back EMF signal or a portion of an electrical period, indicative of the speed of the rotor 18. The PWM controller 62 further calculates a position of the rotor 18 based on the back EMF signal. Further, the PWM controller 62 calculates a third back EMF amplitude value based on the back EMF signals (bemf-a), (bemf-b), and (bemf-c) utilizing the steps 120–124.

In the illustrated embodiment, the PWM controller 62 calculates the electrical period by measuring the time between time T4 when the (bemf-a) signal crosses a zero voltage and the time T5 when the (bemf-a) signal crosses a zero voltage. It should be understood, however, that the electrical period could be determined by utilizing back EMF signals generated in multiple phase coils. For example, the controller 62 could calculate the electrical period by measuring the time between time T1 when the (bemf-a) signal crosses a zero voltage and the time T2 when the (bemf-c) signal crosses a zero voltage—which is indicative of one-sixth of an electrical period. Alternately, the controller 62 could calculate the electrical period by measuring the time between time T1 when the (bemf-a) signal crosses a zero voltage and the time T3 when the (bemf-b) signal crosses a zero voltage—which is indicative of one-third of an electrical period. It should be noted that if a known portion of an electrical period is determined, the entire electrical period can be readily determined.

At step 108, the PWM controller 62 applies a seventh commutation pulse 160 to the phase coil 20 and an eighth commutation pulse 162 to the phase coil 21 over a fifth time interval ΔT5 based on the calculated electrical period or portion of the electrical period, wherein the commutation pulses 160, 162 each have an amplitude based on the third back EMF amplitude value. In particular, commutation pulses 160, 162 can have an amplitude greater than or equal to the third back EMF amplitude value.

Further, the duration of the commutation pulses 160, 162 are calculated based upon the calculated electrical period ΔTE. For example, the duration ΔTS of the commutation pulses 160, 162 can be approximately one-sixth of the calculated electrical period ΔTE or less.

At step 110, the PWM controller 62 applies a ninth commutation pulse 164 to a phase coil 20 and a tenth commutation pulse 166 to the phase coil 22 over a sixth time interval ΔT6 based on the calculated electrical period or portion of an electrical period, wherein the commutation pulses 164, 166 each have an amplitude based on the third back EMF amplitude value. In particular, commutation pulses 164, 166 can have an amplitude greater than or equal to the third back EMF amplitude value and greater than the amplitude of the commutation pulses 160, 162. Further, the duration of the commutation pulses 164, 166 are calculated based upon the calculated electrical period ΔTE. For example, the duration ΔT6 of the commutation pulses 164, 166 can be approximately three-fourths of the duration of the commutations pulses 160, 162 to compensate for an accelerating rotor 18.

At step 112, the PWM controller 62 simultaneously de-energizes all phase coils 20, 21, 22.

At step 114, the PWM controller 62 calculates a fourth back EMF amplitude value based on the back EMF signals (bemf-a), (bemf-b), and (bemf-c) utilizing the steps 120–124.

At step 116, the PWM controller 62 makes determination as to whether the fourth back EMF amplitude value is greater than a closed-loop threshold value. If the value of step 116 equals "yes", the method advances to step 118. Otherwise, the method returns to step 104.

At step 118, the PWM controller 62 selectively applies commutation pulses to the phase coils 20, 21, 22 using closed-loop control based on the back EMF signals (bemf-a), (bemf-b), and (bemf-c).

As discussed above, the system and method for starting a brushless DC motor provides a substantial advantage over known systems and methods. In particular, the system and method measures an electrical period during start-up when all of the motor phases are de-energized, and then adjusts the duration of subsequent commutation pulses based on the period (indicative of rotor speed) to repeatedly start up the motor under varying start-up conditions.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first, second, etc. does not denote any order of importance, but rather the term's first, second, etc. are us are used to distinguish one element from another.

We claim:

1. A method for starting a brushless direct current motor, comprising:
    simultaneously applying commutation pulses to at least two phase coils to induce a rotor to rotate to a starting position and then de-energizing the at least two phase coils;
    simultaneously applying commutation pulses to at least two phase coils to induce the rotor to rotate from the starting position in a predetermined direction;
    de-energizing all phase coils for a first time interval after the rotor is rotating and sampling a back EMF signal in at least one of the phase coils to determine a first value indicative of an electrical period of the back EMF signal or a portion of an electrical period of the back EMF signal; and,
    applying commutation pulses to at least two phase coils for a second time interval, the second time interval being based on the first value.

2. The method of claim 1 wherein applying commutation pulses to at least two phase coils to induce the rotor to rotate from the starting position in the predetermined direction, comprises:
    iteratively applying first and second commutation pulses to first and second phase coils, respectively, and then simultaneously de-energizing all of the phase coils.

3. The method of claim 2 further comprising
    calculating a back EMF amplitude value associated with at least one of the phase coils when the phase coils are simultaneously de-energized; and,
    determining when the back EMF amplitude value is greater than a threshold value.

4. The method of claim 3 wherein calculating the back EMF amplitude value, comprises:
    measuring back EMF signals in all of the phase coils to determine back EMF signal values when all phase coils are simultaneously de-energized;
    determining a greatest back EMF signal value and a lowest back EMF signal value from the EMF signal values;
    determining the back EMF amplitude value by subtracting the lowest back EMF signal value from the greatest back EMF signal value.

5. The method of claim 3 wherein the first time interval commences when the back EMF amplitude value is greater than the threshold value.

6. The method of claim 1 wherein the second time interval commences when a back EMF signal associated with one of the phase coils indicates the rotor is at a predetermined position.

7. The method of claim 1 further comprising:
    determining a back EMF amplitude value during the first time interval based on a back EMF signal from at least one of the phase coils; and,
    applying commutation pulses to at least two phase coils during the second time interval having an amplitude based on the back EMF amplitude value.

8. The method of claim 1 wherein the first value corresponds to at least one half of the electrical period of a back EMF signal associated with a phase coil.

9. The method of claim 1 wherein the first value is further indicative of a speed of the rotor of the motor.

10. A system for starting a brushless direct current motor having a plurality of phase coils, comprising:
    a control circuit configured to be electrically coupled to the plurality of phase coils, the control circuit configured to simultaneously apply commutation pulses to at least two phase coils to induce a rotor to rotate to a starting position and then de-energizing the at least two phase coils, the control circuit being further configured to simultaneously apply commutation pulses to at least two phase coils to induce the rotor to rotate from the starting position in a predetermined direction, the control circuit further configured to de-energize all phase coils for a first time interval after the rotor is rotating and to sample a back EMF signal in at least one of the phase coils to determine a first value indicative of an electrical period of the back EMF signal or a portion of an electrical period of the back EMF signal, the control circuit further configured to apply commutation pulses to at least two phase coils for a second time interval, the second time interval being based on the first value.

11. The system of claim 10 wherein the control circuit is further configured to iteratively apply first and second commutation pulses to first and second phase coils, respectively, and then to simultaneously de-energize all of the phase coils, to induce the rotor to rotate from the starting position in the predetermined direction.

12. The system of claim 11 wherein the control circuit is further configured to calculate a back EMF amplitude value associated with at least one of the phase coils when the phase coils are simultaneously de-energized, the control circuit being further configured to determine when the back EMF amplitude value is greater than a threshold value.

13. The system of claim 12 wherein the control circuit is further configured to measure back EMF signals in all of the phase coils to determine back EMF signal values, the controller being further configured to determine a greatest back EMF signal value and a lowest back EMF signal value from the EMF signal values, the controller being further configured to calculate the back EMF amplitude value by subtracting the lowest back EMF signal value from the greatest back EMF signal value, the control circuit being further configured to compare the back EMF amplitude value to the threshold value.

14. The system of claim 10 wherein the first value corresponds to at least one half of the electrical period of a back EMF signal associated with a phase coil.

15. An article of manufacture, comprising:
    a computer storage medium having a computer program encoded therein for starting a brushless direct current motor, the computer storage medium including:
    code for simultaneously applying commutation pulses to at least two phase coils to induce a rotor to rotate to a starting position and then de-energizing the at least two phase coils;
    code for simultaneously applying commutation pulses to at least two phase coils to induce the rotor to rotate from the starting position in a predetermined direction;
    code for de-energizing all phase coils for a first time interval after the rotor is rotating and sampling a back EMF signal in at least one of the phase coils to determine a first value indicative of an electrical period of the back EMF signal or a portion of an electrical period of the back EMF signal; and, code for applying commutation pulses to at least two phase coils for a second time interval, the second time interval being based on the first value.

16. The article of manufacture of claim 15 wherein the code for applying commutation pulses to at least two phase coils to induce the rotor to rotate to the starting position and then de-energizing the at least two phase coils comprises:
   code for iteratively applying first and second commutation pulses to first and second phase coils, respectively, and then simultaneously de-energizing all of the phase coils.

17. The article of manufacture of claim 16 wherein the computer storage medium further comprises:
   code for calculating a back EMF amplitude value associated with at least one of the phase coils when the phase coils are simultaneously de-energized; and,
   code for determining when the back EMF amplitude value is greater than a threshold value.

18. The article of manufacture of claim 17 wherein the code for calculating a back EMF amplitude value comprises:
   code for measuring back EMF signals in all of the phase coils to determine back EMF signal values when all phase coils are de-energized;
   code for determining a greatest back EMF signal value and a lowest back EMF signal value from the EMF signal values;
   code for determining the back EMF amplitude value by subtracting the lowest back EMF signal value from the greatest back EMF signal value.

19. A method for starting a brushless direct current motor, comprising:
   applying commutation pulses to at least two phase coils to induce a rotor to rotate to a starting position and then de-energizing the at least two phase coils;
   applying commutation pulses to at least two phase coils to induce the rotor to rotate from the starting position in a predetermined direction;
   de-energizing all phase coils for a first time interval after the rotor is rotating and sampling back EMF signals from all phase coils and determining a back EMF amplitude value based on the back EMF signals, wherein determining the back EMF amplitude value comprises: measuring EMF signals in all of the phase coils to determine back EMF signal values when all phase coils are de-energized, determining a greatest back EMF signal value and a lowest back EMF signal value from the EMF signal values, and calculating the back EMF amplitude value by subtracting the lowest back EMF signal value from the greatest back EMF signal value; and,
   applying commutation pulses to at least two phase coils having an amplitude based on the back EMF amplitude value.

* * * * *